United States Patent
Fiandrotti et al.

(10) Patent No.: US 12,271,812 B2
(45) Date of Patent: Apr. 8, 2025

(54) NEURAL NETWORKS HAVING REDUCED NUMBER OF PARAMETERS

(71) Applicant: TELECOM ITALIA S.p.A., Milan (IT)

(72) Inventors: Attilio Fiandrotti, Turin (IT); Gianluca Francini, Turin (IT); Skjalg Lepsoy, Turin (IT); Enzo Tartaglione, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 1051 days.

(21) Appl. No.: 17/251,508

(22) PCT Filed: Jul. 18, 2019

(86) PCT No.: PCT/EP2019/069326
§ 371 (c)(1),
(2) Date: Dec. 11, 2020

(87) PCT Pub. No.: WO2020/016337
PCT Pub. Date: Jan. 23, 2020

(65) Prior Publication Data
US 2021/0142175 A1    May 13, 2021

(30) Foreign Application Priority Data
Jul. 20, 2018  (IT) .................. 102018000007377

(51) Int. Cl.
*G06N 3/08* (2023.01)
*G05D 1/00* (2024.01)
*G06N 3/04* (2023.01)

(52) U.S. Cl.
CPC ............ *G06N 3/08* (2013.01); *G05D 1/0088* (2013.01); *G06N 3/04* (2013.01)

(58) Field of Classification Search
CPC ............ G06N 3/08; G06N 3/04; G06N 3/045; G06N 3/084; G06N 3/082; G05D 1/0088
See application file for complete search history.

(56) References Cited

U.S. PATENT DOCUMENTS

2018/0259970 A1*  9/2018  Wang ................. G06F 18/24133
2019/0205759 A1*  7/2019  Zhang ....................... G06N 3/10

OTHER PUBLICATIONS

Jin, Wen, et al. "The improvements of BP neural network learning algorithm." WCC 2000-ICSP 2000. 2000 5th international conference on signal processing proceedings. 16th world computer congress 2000. vol. 3. IEEE, 2000. (Year: 2000).*

(Continued)

*Primary Examiner* — Michael W Ayers
*Assistant Examiner* — Nicholas S Wu
(74) *Attorney, Agent, or Firm* — Oblon, McClelland, Maier & Neustadt, L.L.P.

(57) ABSTRACT

A method includes providing a neural network having a set of weights. The neural network receives an input data structure for generating a corresponding output array according to values of the set of weights. The neural network is trained to obtain a trained neural network. The training includes setting values of the set of weights with a gradient descent algorithm which exploits a cost function including a loss term and a regularization term. The trained neural network is deployed on a device through a communication network, and used by the device. The regularization term is based on a rate of change of elements of the output array caused by variations of the set of weights values.

10 Claims, 6 Drawing Sheets

(56) References Cited

OTHER PUBLICATIONS

Augasta, M. Gethsiyal, and T. Kathirvalavakumar. "A novel pruning algorithm for optimizing feedforward neural network of classification problems." Neural processing letters 34 (2011): 241-258. (Year: 2011).*

Han, Song, et al. "Learning both weights and connections for efficient neural network." Advances in neural information processing systems 28 (2015). (Year: 2015).*

Kukačka, Jan, Vladimir Golkov, and Daniel Cremers. "Regularization for deep learning: A taxonomy." arXiv preprint arXiv: 1710. 10686 (2017). (Year: 2017).*

Nagpal, Anuja. "L1 and L2 Regularization Methods." Medium. Towards Data Science (2017). (Year: 2017).*

Murugan, Pushparaja. "Implementation of deep convolutional neural network in multi-class categorical image classification." arXiv preprint arXiv:1801.01397 (2018). (Year: 2018).*

Zhang, Zhilu, and Mert R. Sabuncu. "Generalized Cross Entropy Loss for Training Deep Neural Networks with Noisy Labels." arXiv e-prints (2018): arXiv-1805. (Year: 2018).*

Engelbrecht, Andries P. "A new pruning heuristic based on variance analysis of sensitivity information." IEEE transactions on Neural Networks 12.6 (2001): 1386-1399. (Year: 2001).*

Kowalski, Piotr A., and Maciej Kusy. "Sensitivity analysis for probabilistic neural network structure reduction." IEEE transactions on neural networks and learning systems 29.5 (2017): 1919-1932. (Year: 2017).*

Zeng, Xiaoqin, and Daniel S. Yeung. "Hidden neuron pruning of multilayer perceptrons using a quantified sensitivity measure." Neurocomputing 69.7-9 (2006): 825-837. (Year: 2006).*

Yeung, Daniel S., et al. "MLPNN training via a multiobjective optimization of training error and stochastic sensitivity." IEEE transactions on neural networks and learning systems 27.5 (2015): 978-992. (Year: 2015).*

Wang, Jian, et al. "A novel pruning algorithm for smoothing feedforward neural networks based on group lasso method." IEEE transactions on neural networks and learning systems 29.5 (2017): 2012-2024. (Year: 2017).*

International Search Report and Written Opinion issued on Oct. 24, 2019 in PCT/EP2019/069326 filed on Jul. 18, 2019.

Han, S. et al., "Learning both Weights and Connections for Efficient Neural Networks," 2015, https://arxiv.org/pdf/1506.02626.pdf, pp. 1-9, XP055396330.

Kukačka, J. et al., "Regularization for Deep Learning: A Taxonomy," arxiv.org, Cornell University Library, 2017, pp. 1-23, XP080832727.

Hochreiter, S. et al., "Flat Minima," Neural Computation, vol. 9, 1997, pp. 1-42, XP055500601.

Mrazova, I. et al., "Can Deep Neural Networks Discover Meaningful Pattern Features?" Procedia Computer Science, vol. 12, 2012, pp. 194-199, XP055576293.

Mrázová, I. et al., "Fast Sensitivity-Based Training of BP-Networks," Artificial Neural Networks and Machine Learning—ICANN 2014, 2014, pp. 507-514, XP055576290.

* cited by examiner

NEURAL NETWORKS HAVING REDUCED NUMBER OF PARAMETERS

BACKGROUND OF THE INVENTION

Field of the Invention

The present invention relates to the field of neural networks.

Description of the Related Art

Artificial Neural Networks (hereinafter, briefly "ANN") have seen an explosion of interest over the last few years and are being successfully applied across a wide range of application fields, comprising control systems, robotics, pattern recognition systems, forecasting, medicine, power systems, manufacturing, optimization, signal processing, and social/psychological sciences.

Among the application fields of ANN, object classification of images (hereinafter, simply "object classification") has become increasingly important as the use of digital image capture devices—such as smartphones or other portable devices including a digital camera—grows. Object classification is a procedure that provides for assigning labels to object(s) depicted in a (digital) image according to predefined image classes. Object classification provides for selecting an appropriate class for the object depicted in the image among the available predefined image classes by analyzing visual patterns of the image. In particular, object classification may be based on the known machine learning approach usually referred to as "deep learning" applied to ANN.

As it is well known to those skilled in the art, the basic element of an ANN is the neuron, also referred to as node. Each neuron has a single output but it might have many inputs. The output of a neuron is the result of applying a non-linear function to a linear combination of its inputs added to a constant value usually known as bias. The coefficients of this linear combination are usually called weights w and the non-linear function is usually called activation function. ANN are arranged according to a sequence of so-called "layers". Each layer contains a corresponding set of neurons. The output of a neuron belonging to a layer may serve as an input to a neuron belonging to the next layer of the sequence.

As disclosed for example in *Gradient-based learning applied to document recognition* by LeCun, Yann, et al., Proceedings of the IEEE 86.11 (1998), Convolutional Neural Network (hereinafter, briefly "CNN") is a kind of ANN that is particularly advantageous to be exploited in the object classification field. For this reason, most of the approaches actually employed in the object classification field are based on CNN. A CNN is an ANN comprising at least one convolutional layer, i.e., a layer comprising neurons that share the same set of weights w (in the image analysis field, said set of weights is usually referred to as "kernel" or "filter") and whose outputs are given by the convolution among the inputs thereof.

Making reference to an exemplary gray-scale digital image comprising $h^2$ pixels arranged in h rows and h columns (input image), wherein each pixel has associated thereto a corresponding pixel value indicative of a corresponding luminance value (for example, the higher the pixel value, the higher the luminance, e.g., using a 1 byte unsigned, a value of 0 corresponds to the lower luminance and a value of 255 to the highest one), and a kernel comprising $k^2$ weights w arranged in a matrix having k×k elements, the convolution between the input image and the kernel provides for processing the image for generating a so-called featuremap comprising a plurality of features, each feature being associated to a corresponding area of k×k pixels (source pixels) of the input image, by carrying out the following operations:

- the k×k kernel is "overlapped" over a corresponding k×k portion of the input image in order to have each source pixel of said portion of the input image that is associated with a corresponding element of the kernel matrix, with the center element of the kernel matrix which is associated with a central source pixel of said portion;
- the pixel value of each pixel included in said portion of the input image is weighted by multiplying it with the weight w corresponding to the associated element of the kernel matrix;
- the weighted pixel values are summed to each other, and a corresponding bias is added;
- an activation function is applied, obtaining this way a feature associated to the examined portion of the input image; such feature is saved in a position of the featuremap corresponding to the central source pixel.
- the filter is shifted, horizontally and vertically, by a stride corresponding equal to an integer value (e.g., 1 pixel)
- the above steps are repeated to cover all the pixels of the input image, in order to obtain a complete featuremap.

Generalizing, the convolutional layer of a CNN having as input a square h×h digital signal (also generally referred to as "input data structure" or simply "input structure") comprising $h^2$ values obtained by sampling such signal (such as the abovementioned $h^2$ pixel values of the exemplary h×h gray-scale digital input image), and having a kernel comprising $k^2$ weights w arranged in a square matrix having k×k elements, outputs a (h−k+1)×(h−k+1) digital signal forming an output data structure (featuremap) comprising $(h-k+1)^2$ values (features).

Similar considerations apply if the input data structure and/or the kernel matrix have a different shape, such as a rectangular shape.

With reference to the considered example, the weights w of the k×k kernel may be set to represent a particular visual pattern to be searched in the input structure representing the input image. In this case, the output of the convolutional layer is a data structure corresponding to a featuremap having (h−k+1)×(h−k+1) features, wherein each feature of said featuremap may have a value that quantifies how much such particular visual pattern is present in a corresponding portion of the input image (e.g., the higher the value of the feature in the feature map, the more such particular visual pattern is present in the corresponding portion of the input image). This operation is well known from communication engineering, where it is known as "signal detection using matched filters", see for example *Modern Electrical Communications* by H. Stark and F. B. Tuteur, Chapter 11.6, Prentice-Hall, 1979 (pages 484-488).

In a typical convolutional layer of a CNN, the input structure may be formed by CH equally sized channels. Making for example reference to the object classification field, a h×h digital color image may be represented through an RGB model by a set of CH=3 different channels: the first channel (R channel) is a digital image having h×h pixels and corresponding to the red component of the colored digital image, the second channel (G channel) is a digital image having h×h pixels and corresponding to the green component of the colored digital image, and the third channel (B channel) is a digital image having h×h pixels and corresponding to the blue component of the colored digital image.

Typically, a set of NF kernels is used for a single convolutional layer. In this case, the output structure will comprise in turn NF featuremaps.

Therefore, considering a generic scenario, in which the input structure of a convolutional layer is convolved with NF kernels, the number $NP_{CL}$ of learnable parameters in the layer (weights w plus biases) is equal to:

$$NP_{CL}=NC*NF*(k*k+1), \qquad (1).$$

wherein NC is the number of input channels of the convolutional layer.

As can be read for example in *OverFeat: Integrated Recognition, Localization and Detection using Convolutional Networks*, by Pierre Sermanet, David Eigen, Xiang Zhang, Michael Mathieu, Rob Fergus, and Yann LeCun, arXiv preprint arXiv:1312.6229, pages 1-15, 2013, an efficient object classification algorithm—i.e., an algorithm capable of classifying objects in correct classes with a low classification error—based on CNN usually comprises several convolutional layers, typically interleaved with subsampling layers (e.g., the so-called max-pooling layers), followed by a sequence of final, fully-connected (i.e., non-convolutional) layers acting as final classifier which output as output structure a classification array providing indications about a corresponding selected class among available classification classes.

The number $NP_{FC}$ of learnable parameters (weights plus biases) of a generic fully connected layer having NU exits and which processes a number N of inputs received from the previous layer is equal to:

$$NP_{FC}=NU*(N+1) \qquad (2).$$

A very important aspect of a CNN regards the way the weights of the kernels of the various convolutional layers are set. The efficiency of an object classification algorithm exploiting a CNN is strictly dependent on the weight w values. If the weight w values are not correctly set, objects are classified in wrong classes. In order to set the weights w of a CNN, the CNN is subjected to a training procedure, such as the so-called backpropagation training procedure disclosed for example at page 153 of *Neural Networks and Learning Machines*, 3/E by Simon Haykin, Prentice Hall (Nov. 18, 2008).

The backpropagation training procedure provides for two main phases: the forward phase and the backward phase.

The forward phase provides for inputting as input data structure a training image belonging to a known class to the CNN to be trained, and then comparing the corresponding output—i.e., the output classification array corresponding the actual weight w values—with the correct known output—i.e., a target classification array corresponding to the correct known class. Since the CNN is not yet trained, the output classification array will be generally different from the target classification array. The output classification array is then compared with the target classification array, and a corresponding loss term is computed, which provides a quantification of a classification error produced by the CNN (i.e., a quantification of how much the output classification array is different from the target classification array).

Having C different classes, and providing an input training image x belonging to one of said C classes to the CNN, the CNN generates a corresponding output classification array y(x;W), wherein W represents the whole set of weights w included in the CNN (i.e., all the weights w corresponding to all the neurons in all the layers of the CNN). The output classification array y(x;W) generated by the CNN is an array of C elements $y_c(x;W)$, c=1 to C, wherein each element $y_c(x;W)$ corresponds to a respective class IC(c) and has a value providing the probability that such input training image belongs to such specific class IC(c). The target classification array t(x) corresponding to a training image x belonging to class IC(c*) is an array of C elements $t_c(x)$, c=1 to C, wherein $t_c(x)=1$ for c=c* and $t_c(x)=0$ for c≠c*.

In order to calculate the abovementioned loss term, a loss function can be used. A loss function L(y(x;W),t(x)) is a function which depends on the input training image x and on the corresponding output classification array y(x;W). Broadly speaking, a loss function L(y(x;W),t(x)) is a function that allows to estimate the classification error. The loss function L(y(x;W),t(x)) is such that, given a specific input training image x and given a specific output classification array y(x;W) generated by the CNN in response to this input training image x, the larger the classification error corresponding to said output classification array y(x;W), the higher the value of said loss function L(y(x;W),t(x)).

For example, considering the simple problem of training a two-outputs network to predict the value of the horizontal and vertical coordinates of a point on a plane, the loss function for training this particular network could be reasonably defined as the Euclidean distance between predicted and target coordinates of the point on the plane.

In general, the loss function must be always defined as positive or equal to zero and its actual choice depends on the specific problem the ANN or the CNN solves. Considering the specific problem of object classification, among the most used loss functions are the so-called Mean Square Error (MSE) loss function, for which $$L(y(x;W), t(x)) = \sqrt{\frac{1}{C}\sum_{c=1}^{C}(y_c(x, W) - t_c(x))^2}$$

(Lehmann, Erich L., and George Casella. *Theory of point estimation*. Springer Science & Business Media, 2006, pag. 51), or the so-called cross-entropy loss function, for which $L(y(x;W),t(x))=-\Sigma_{c=1}^{C}t_c(x)\log(y_c(x;W))$, (de Boer, Pieter-Tjerk; Kroese, Dirk P.; Mannor, Shie; Rubinstein, Reuven Y. (February 2005). "*A Tutorial on the Cross-Entropy Method*". *Annals of Operations Research*. 134 (1), pages 19-67).

After the definition of a proper loss function L(y(x;W),t(x)), a cost function J(y(w,x), t(x)) can be defined in the following way:

$$J(W;x,t(x))=\eta L(y(x;W),t(x))+\lambda R(W) \qquad (3)$$

wherein η is a positive real number called learning rate, λ is a positive real number called decay rate, and R(W) is a regularization function. As it is well known to those skilled in the art, the regularization function R(W) is a function that influences the cost function J(W;x,t(x)) by providing a rule—e.g., through the issuing of proper constraints—on how the weights W of the CNN should be distributed and set. The rule given by the regularization function R(W) is added for influencing the classification error estimation given by the loss function (y(x;W),t(x)).

For example, such rule may provide the constraint of having the weights w to lie on an hypersphere (regularization function of the L2 type), or the constraint of having the weights w that are kept as small as possible (regularization function of the L1 type).

It is known to those skilled in the art that an effect of using a regularization function R(W) is to reduce the effect of the overfitting of the CNN on the training images. A CNN is said to overfit training data if, during the training procedure, the CNN is learning, together with the real information, also undesired noise. Regularization, providing a constraint on the way the weights of the CNN are set and distributed, helps contrast overfitting making frontiers between classes sharper (see Scholkopf, Bernhard, and Alexander J. Smola. *Learning with kernels: support vector machines, regularization, optimization, and beyond*. MIT press, 2002, pages 87-120).

Different regularization functions R(W) are known in the art, based on the n-th order norm of the weights w, such as for example the L0 regularization function (see Guo, Kaiwen, et al. "Robust non-rigid motion tracking and surface reconstruction using l0 regularization." *Proceedings of the IEEE International Conference on Computer Vision.*, 2015, pages 3083-3091).

The L1 regularization function (see Park, Mee Young, and Trevor Hastie. "L1‐regularization path algorithm for generalized linear models." *Journal of the Royal Statistical Society: Series B (Statistical Methodology)* 69.4 (2007): 659-677), or the L2 regularization function (see Bilgic, Berkin, et al. "Fast image reconstruction with L2-regularization." *Journal of Magnetic Resonance Imaging* 40.1 (2014), pages 181-191).

The backward phase of the training procedure provides for calculating the gradient of the cost function $J(W;x,t(x))$ with respect to the weights w for all the layers from the last layer to the first layer.

The forward phase and the backpropagation phase are repeated for a very high number of times, using a very high number of training images, for example taken from a training database.

Immediately after each backpropagation phase, weights w may be updated using a gradient descent operation in order to minimize the cost function $(W;x,t(x))$. In this way, the updating of the weights w is done each time a new training image of the training database is input to the CNN to be trained. Alternatively, the updating of the weights w may be done by firstly applying the forward and backward phases to all the training images of the training database to produce an average of the gradients before updating the weights w. An intermediate alternative may be also contemplated, in which the updating of the weights w is carried out each time the forward and backward phases are carried out on a subset (referred to as "mini-batch") comprising a fixed number of training images of the training database.

In this context, with the term "epoch" it is intended the number of times the entire training database has been inputted to the CNN during the training procedure. Usually, hundreds of epochs are required to make a CNN to converge to its maximum classification accuracy.

The weights w are typically represented by real values hosted in the main memory of the processing system (e.g., computer) used to train the CNN through the abovementioned training procedure. Such values can be permanently saved, for example, into storage memory of the processing system, either at intermediate steps of the training procedure (e.g., after each mini-batch is processed or after each epoch of the training procedure) or at the end of the training procedure.

The knowledge of the CNN topology and of the relative learned weights w allows to completely represent a trained CNN. Once a CNN has been trained, the trained CNN can be used on the same computer to process different data samples or it can be transferred to a different computer.

Training a CNN according to the procedure described above is a resource-intensive process that is practically possible only thanks to the availability of ad-hoc hardware resources. Such resources include ad-hoc designed ICs or Field Programmable Gate Arrays (FPGAs) or Graphical Processing Units (GPUs) equipped with large numbers of computational cores and, most importantly, such hardware includes billions of data memorization units either in the form of cell memory dedicated to hosting the CNN learned weights w. For example, modern GPUs designed specifically for training deep CNN include tens of gigabytes of fast, dedicated memory to permanently store the large number of weights w of a CNN (and relative error gradients at back-propagation time).

The following table provides a parameter (W, weights plus biases) count and relative memory requirements for each one of 16 layer of an exemplary VGG architecture disclosed in paper *Very deep convolutional networks for large scale image recognition* by Simonyan Karen, and Andrew Zisserman, arXiv preprint arXiv: 1409.1556 (2104).

| Layer | Memory | Trainable parameters |
|---|---|---|
| INPUT: [224x224x3] | 224*224*3 = 150K | 0 |
| CONV3-64: [224x224x64] | 224*224*64 = 3.2M | (3*3*3)*64 = 1,728 |
| CONV3-64: [224x224x64] | 224*224*64 = 3.2M | (3*3*64)*64 = 36,864 |
| POOL2: 1112x112x641 | 112*112*64 = 800K | 0 |
| CONV3-128: [112x112x1281] | 112*112*128 = 1.6M | (3*3*64)*128 = 73,728 |
| CONV3-128: [112x112x1281] | 112*112*128 = 1.6M | (3*3*128)*928 = 147,456 |
| POOL2: [56x56x1281] | 56*56*128 = 400K | 0 |
| CONV3-256: [56x56x256] | 56*56*256 = 800K | (3*3*128)*256 = 294,912 |
| CONV3-256: (56x56x256) | 56*56*256 = 800K | (3*3*256)*256 = 589,824 |
| CONV3-256: (56x56x256) | 56*56*256 = 800K | (3*3*256)*256 = 589,824 |
| POOL2: [28x28x256] | 28*28*256 = 200K | 0 |
| CONV3-512: [28x28x512] | 28*28*512 = 400K | (3*3*256)*512 = 1,179,648 |
| CONV3-512: [28x28x512] | 28*28*512 = 400K | (3*3*512)*512 = 2,359,296 |
| CONV3-512: [28x28x512] | 28*28*512 = 400K | (3s3*512)*512 = 2,359,296 |
| POOL2: [14x14x512] | 1494*512 = 100K | 0 |
| CONV3-512: [14x14x512] | 1494*512 = 100K | (3*3*512)*512 = 2,359,296 |
| CONV3-512: [14x14x512] | 1494*512 = 100K | (3*3*512)*512 = 2,359,296 |
| CONV3-512: [14x14x512] | 1494*512 = 100K | (3*3*512)*512 = 2,359,296 |
| POOL2: [7x7x512] | 7*7*512 = 25K | 0 |
| FC: [1x1x4096] | 4096 | 7*7*512*4096 = 102,760,448 |
| FC: [1x1x4096] | 4096 | 4096*4096 = 16,777,216 |
| FC: [1x1x1000] | 1000 | 4096*1000 = 4,096,000 |

The CNN includes over 100 million of trainable parameters for a total footprint of about 132*k Megabytes (wherein k is the size in bytes of a parameter) of memory for a trained CNN. The table shows that the most part of the parameters are included in the first fully connected layer. This finding is not surprising as the number of parameters of the first fully connected layer is proportional to the number of features outputted by the last convolutional layer.

In order to improve the image classification accuracy offered by a CNN, the number of layers should be increased, for example up to 152. An architecture of this kind involves the training of a very large amount of weights w, resulting in even larger memory requirements, which may easily exceed the amount of memory available on the processing system used for the training procedure. For this reason, it is known to use multiple GPUs in parallel to train a CNN, where every GPU trains a subset of the CNN (e.g., each GPU trains a subset of the layers). For example, paper *Outrageously large neural networks: The sparsely-gated mixture-of-experts layer* by Shazeer, Noam, Azalia Mirhoseini, Krzysztof Maziarz, Andy Davis, Quoc Le, Geoffrey Hinton, and Jeff Dean, arXiv preprint arXiv:1701.06538 (2017) describes a CNN trained over an array of multiple GPUs arranged in computing clusters. The total number of parameters of such architecture is very high, being equal to 137 billion.

While CNN are usually trained over server-grade GPUs for the above mentioned reasons, there is great interest in using previously trained CNN on mobile devices, such as tablets or smartphones.

In the following, the process of using a previously trained CNN over a processing device for classifying images will be referred to as "deploying" the (previously trained) CNN over such processing device. The processing device over which the CNN is deployed may be the same processing device used to train the CNN (e.g., a powerful server computer) or may be a different one (e.g., a laptop PC or a smartphone). It has to be appreciated that the training images used to train the CNN would be generally different than the image the CNN should classify when deployed over a processing device for its normal use.

For example, in a typical applicative object classification scenario, a battery-operated mobile device with wireless communication capabilities could locally process the data acquired by local sensors by means of a CNN and take autonomous decisions without communicating with a central server and thus saving battery energy. In another scenario, the user of a mobile phone could take a snapshot of an object. Then, a pre-trained CNN could be used to determine the object type and brand by running the trained CNN over the mobile device GPU. Finally, the user would be redirected via the mobile web browser to an e-shopping site where the user would be able to purchase the object, possibly comparing among different possible options.

From the examples above, it is clear that there is an interest in being able to deploy trained CNN on mobile and other embedded devices.

The present invention addresses one of the main problems that arise when a trained network is deployed over smartphones and other embedded devices.

In fact, while modern mobile devices typically include ad-hoc ICs or GPUs, which provides them sufficient computational capabilities to execute even complex CNN, such devices have a limited storage memory capability due to constraints related to power consumption, price and physical dimensions. Similarly, the amount of working memory of GPUs commonly found in mobile devices is typically one order of magnitude lower than the amount of working memory of their server counterparts. Moreover, in mobile devices often such memory is not dedicated for exclusive use by the GPU, rather it is shared by the central CPU, which may permanently use a significant fraction thereof for other device core functionalities.

In view of the above, it can be understood that the limited memory capabilities of mobile devices strongly put a constraint on the maximum number of parameters of a CNN, or of generic neural networks, when the CNN (or generic neural networks) has to be deployed on mobile devices.

In order to reduce the memory requirements for deploying a trained CNN, so as to allow the CNN to be deployed also in devices having low memory capabilities, several simple solutions have been already proposed.

For example, according to a first known solution (see Gupta, Suyog, et al. "Deep learning with limited numerical precision" *International Conference on Machine Learning*. 2015), trained parameters (which are real numbers) may be stored with a reduced precision. For example, trained parameters may be stored according to the recently standardized IEEE half-precision format rather than with the typical single precision format.

Another known approach (see Han, Song, Jeff Pool, John Tran, and William Dally. "Learning both weights and connections for efficient neural network" *In Advances in Neural Information Processing Systems*, pages 1135-1143. 2015) consists in simplifying the network topology (e.g., by removing layers or units from the layers) when the training procedure is carried out, until the trained CNN meets the capabilities the target mobile device where the CNN is to be deployed.

A possible option for reducing the memory requirements of a CNN without affecting its topology is carrying out a training procedure directed to increase the sparsity of the CNN. As it is well known to those skilled in the art, the sparsity of a CNN is defined as the ratio between the number of parameters of the CNN equal to zero and the total number of parameters of the CNN (see Tewarson, Reginald P. (May 1973). *Sparse Matrices* (*Part of the Mathematics in Science & Engineering series*). Academic Press Inc pages 1-13).

A CNN where a large number of parameters are equal to zero, i.e., with a high sparsity, is said to be sparse. The more a CNN is sparse, the lower the memory space requirement.

It has been observed that if a training procedure is carried out by using the abovementioned L1 regularization function R(w), several weights w of the CNN take very low values, close to zero.

The paper by Han Song, Jeff Pool, John Tran, and William Dally proposes a three-staged approach to train sparse network topologies. Firstly, a network is trained via backpropagation, but instead of setting the actual weights by minimizing some target loss function, a coarse measurement of each connection's importance is carried out. Then, all connections with an importance index below some threshold are set to zero (pruned). Finally, the resulting network is trained with standard backpropagation in such a way to set the actual weights.

In "Dropout: A Simple Way to Prevent Neural Networks from Overfitting" by Nitish Srivastava, Geoffrey Hinton, Alex Krizhevsky, Ilya Sutskever, Ruslan Salakhutdinov, *Journal of Machine Learning Research* 15 (2014)) it is shown how dropout usage enhances learning and causes sparsification.

In "Sparse Convolutional Neural Networks" by Baoyuan Liu, Min Wang, Hassan Foroosh, 2015 *IEEE Conference on Computer Vision and Pattern Recognition (CVPR)*, 7-12 Jun. 2015, a decomposition method for convolutional layers of a CNN is proposed, introducing the concept of "Sparse Convolutional Neural Network". In particular, 4-dimensional convolutions are transformed into 2-dimensional matrix multiplications. The 2D matrices yielded by such proposed decomposition are highly sparse (90% of sparsity reported), implying that high parameter redundancy exists for high-dimension kernels. According to this high sparsity, a custom sparse multiplication algorithm is also proposed to maximize cache hits.

SUMMARY OF THE INVENTION

The Applicant has found that the abovementioned known solutions for reducing the memory occupation of a CNN, or a generic neural network, in order to allow such CNN to be deployed on a processing device equipped with low memory capabilities are not efficient.

For example, the known solution by Gupta, Suyog, et al which provides for memorizing the trained parameters with a reduced precision has been observed to provide only very scarce memory savings.

The known solution by Han, Song, Jeff Pool, John Tran, and William Dally which provided for simplifying the network topology when the training procedure is carried out has the disadvantage of requiring the training of a separate CNN having a specific (simplified) network topology for mobile devices. Moreover, such solution also impairs the CNN performance or severely limits the size of input data structure (e.g., the image to be classified) that the CNN is able to process.

Moreover, Applicant has found that even if very low weights w, obtained at the end of a training procedure which exploited the abovementioned L1 regularization function, are set to zero (for example, by means of a threshold based pruning operation), the performance of the resulting pruned CNN is impaired.

The paper by Han, Song, Jeff Pool, John Tran, and William Dally discloses an approach which provides reduced complexity for obtaining better performance by avoiding network over-parametrization. However, this approach forces the execution of a refinement process after the learning step. This will disadvantageously bring the new, less-parametrized network, into an energy minimum which strongly depends from the learning dynamic of the "over-parametrized" network. Furthermore, the parameters pruning is carried out without taking into account the real activity which depends on the parameters.

The paper by Nitish Srivastava, Geoffrey Hinton, Alex Krizhevsky, Ilya Sutskever, Ruslan Salakhutdinov discloses an approach which produces a too much over-parametrized network.

The paper by Baoyuan Liu, Min Wang, Hassan Foroosh, simply provides results concerning convolutional layers sparsity.

In view of the above, Applicant has tackled the problem of providing a neural network training procedure (and a corresponding training system) which generates a trained neural network having a reduced memory footprint (i.e., which requires a reduced amount of memory to store its parameters) and at the same time is capable of operating with sufficiently high performance.

Applicant has found that this can be achieved by properly modifying the regularization function of the cost function used for training a neural network.

On this regard, Applicant has devised a regularization function which promotes low values of the weights in the neural network without reducing the performance of the network itself by taking into account a rate of change of the neural network output caused by variations of the weights.

An aspect of the present invention relates to a method.

According to an embodiment of the present invention, the method comprises providing a neural network having a set of weights and being configured to receive an input data structure for generating a corresponding output array according to values of said set of weights.

According to an embodiment of the present invention, the method further comprises training the neural network to obtain a trained neural network.

According to an embodiment of the present invention, said training comprising setting values of the set of weights by means of a gradient descent algorithm which exploits a cost function comprising a loss term and a regularization term.

According to an embodiment of the present invention, the method further comprises deploying the trained neural network on a device through a communication network.

According to an embodiment of the present invention, the method further comprises using the deployed trained neural network on the device.

According to an embodiment of the present invention, the regularization term is based on a rate of change of elements of the output array caused by variations of the set of weights values.

According to an embodiment of the present invention, said regularization term is based on a sum of penalties each one penalizing a corresponding weight of the set of weights, each penalty being based on the product of a first factor and a second factor.

According to an embodiment of the present invention, said first factor is based on a power of said corresponding weight, particularly a square of the corresponding weight.

According to an embodiment of the present invention, said second factor is based on a function of how sensitive the output array is to a change in the corresponding weight.

According to an embodiment of the present invention, said function corresponds to the average of absolute values of derivatives of output elements of the output array with respect to the weight.

According to an embodiment of the present invention, said training comprises, for each one among a plurality of training input data structures, comparing the output array generated by the neural network according to said training input data structure with a corresponding target output array having only one nonzero element.

According to an embodiment of the present invention, said function corresponds to the absolute value of the derivative, with respect to the weight, of an element of the output array corresponding to said one nonzero element of the target output array.

According to an embodiment of the present invention, said training comprises calculating a corresponding updated weight from each weight of the set of weights by subtracting from said weight:
  a first term based on the derivative of the loss term with respect to the weights, and
  a second term based on the product of said weight and a further function, said further function being equal to one minus said function if said function is not higher than one, and being equal to zero if said function is higher than one.

According to an embodiment of the present invention, said training further comprises setting to zero weights of the set of weights having a value lower than a corresponding threshold.

According to an embodiment of the present invention, the method further comprises setting said threshold to a selected one between:
  a threshold value based on the mean of the non-zero weights;

a threshold value such that a ratio of a first set size to a second set size is equal to a constant, wherein said first set size is the number of nonzero weights whose absolute values are smaller than or equal to said threshold value and said second set size is equal to the number of all nonzero weights.

According to an embodiment of the present invention, said deploying the trained neural network on a device comprises sending non-zero weights of the trained neural network to the device through said communication network.

According to an embodiment of the present invention, said using the deployed trained neural network on the device comprises using the deployed trained neural network with an application for a visual object classification running on the device.

According to an embodiment of the present invention, said device is a mobile device.

According to an embodiment of the present invention, said device is a processing device of a control system of a self-driving vehicle.

BRIEF DESCRIPTION OF THE DRAWINGS

These and other features and advantages of the present invention will be made evident by the following description of some exemplary and non-limitative embodiments thereof, to be read in conjunction with the attached drawings, wherein.

DETAILED DESCRIPTION OF EXEMPLARY EMBODIMENTS OF THE INVENTION

Figure 1:
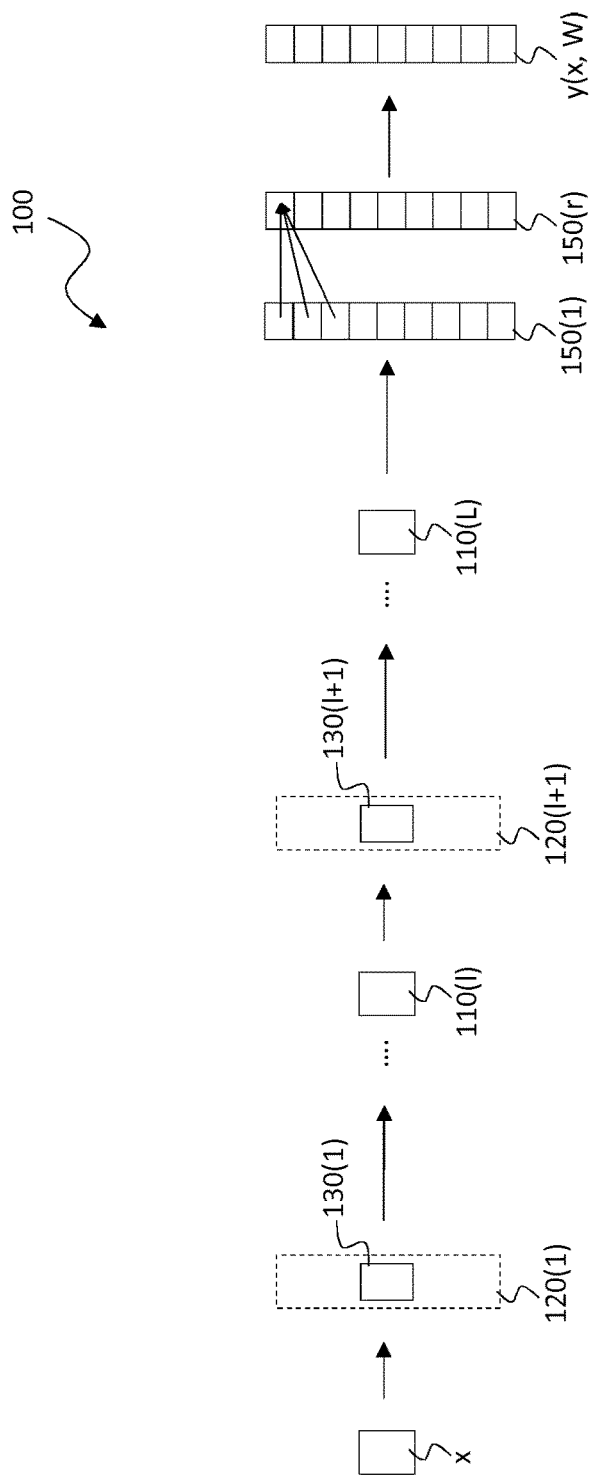
FIG. 1 illustrates a portion of a CNN adapted to be used in an object classification procedure wherein the concepts according to embodiments of the present invention can be applied.

FIG. 1 illustrates a portion of a CNN 100 adapted to be used in an object classification procedure wherein the concepts according to embodiments of the present invention can be applied.

The CNN 100 is configured to receive as input a digital image x (input image) depicting an object, and to select an appropriate class for the object depicted in the input image x among a plurality of C predefined image classes IC(c) (c=1, 2, . . . , C), such as for example:

IC(1)=person image class;
IC(2)=cat image class;
IC(3)=dog image class;
IC(4)=car image class;
IC(5)=house image class,
. . .

For this purpose, the CNN 100 is designed to process the input image x in order to generate a corresponding classification array which provides an indication about a selected image class IC(c) among the available predefined ones. The classification array will be denoted by y(x;W). Here, W represents the whole set of weights w of the CNN $W=\{w_1, \ldots, w_k\}$ where it is assumed that the CNN has a total of K weights. The CNN is organized in layers, and the l'th layer contains a subset of the weights $W_l \subseteq W$.

For example, the classification array y(x;W) comprises C elements $y_c(x;W)$; each one corresponding to an image class IC(c) and having a value indicating the probability that the input image x depicts an object belonging to that image class IC(c). Said value may either represent directly such a probability or it may be successively transformed into such a probability by applying a mapping such as the softmax function, see Bridle, J. S. (1990). "Training stochastic model recognition algorithms as networks can lead to maximum mutual information estimation of parameters". *In Advances in neural information processing systems* (pages 211-217).

In order to simplify the description, the CNN 100 of FIG. 1 is adapted to process an input image having a single channel (e.g., a gray-scale image), in which each layer of the CNN 100 provides for a single kernel, and in which each layer outputs a single channel. However, similar considerations apply if the input image has more than one channel and more than one kernel are used in at least some layers.

The input image x is a digital image having h×h pixels (e.g., h may be equal to 112). Similar considerations apply if the input image x has a different resolution (i.e., it includes a different number of pixels). On this regard, even if reference has been made to a square input image, similar considerations apply in case the input image has a different shape, such as a rectangular shape.

The CNN 100 comprises an ordered sequence of L layers 120(l) (l=1, 2, . . . L), with the generic layer 120(l) of the sequence which is configured to:

receive from the previous layer 120(l−1) of the sequence a corresponding input structure 110(l−1) comprising a corresponding set of h(l−1)×h(l−1) features;

process said received input structure 110(l−1) by exploiting a kernel 130(l) comprising a corresponding set of k(l)×k(l) weights w and generate a corresponding output structure 110(l) comprising a corresponding set of h(l)−k(l)+1×h(l)−k(l)+1 features.

The first layer 120(1) of the CNN 100 is configured to receive as input structure the input image x comprising a corresponding set of h(0)×h(0) pixels.

Each layer 120(l) of the sequence is a convolutional layer configured to carry out a convolution procedure for generating an output structure 110(l) from the received input structure 110(l−1) using the kernel 130(l) as it is well known to those skilled in the art.

Some of the convolutional layers 120(l) of the sequence may be followed by a corresponding max-pooling layer (not illustrated), which is configured to carry out a subsampling procedure directed to generate a subsampled version of the structure 110(l) received from the convolutional layer 120(l). The subsampling procedure provides for spanning a movable selection window over the structure 110(l) in order to select corresponding sets of features and generating for each selected set of features a corresponding feature having the highest value among the ones of the selected set of features. Purpose of this subsampling procedure is to allow for some degree of translation invariance and to reduce the computational requirements for the following layers 120(l) of the sequence. Similar considerations apply if the subsampling procedure is carried out in a different way, such as for example by calculating the average among the values of the selected set of features.

The CNN 100 further comprises r additional layers 150(1), 150(2), ..., 150(r) of the fully-connected type, i.e., non-convolutional layers designed to generate output structures from input structures wherein each output value of the output structure is a function of all the input values of the input structure. The additional layers 150(1), 150(2), ..., 150(r) act as final classifiers having a number of output neurons equal to the number of possible predefined image classes IC(c), so that each output neuron is associated to a specific one among the predefined image classes IC(c).

The first additional layer 150(1) is designed to receive as input structure the output structure 110(L) generated by the last layer 120(L), while the last additional layer 150(r) is designed to generate as output structure the classification array y(x;W).

Figure 2:
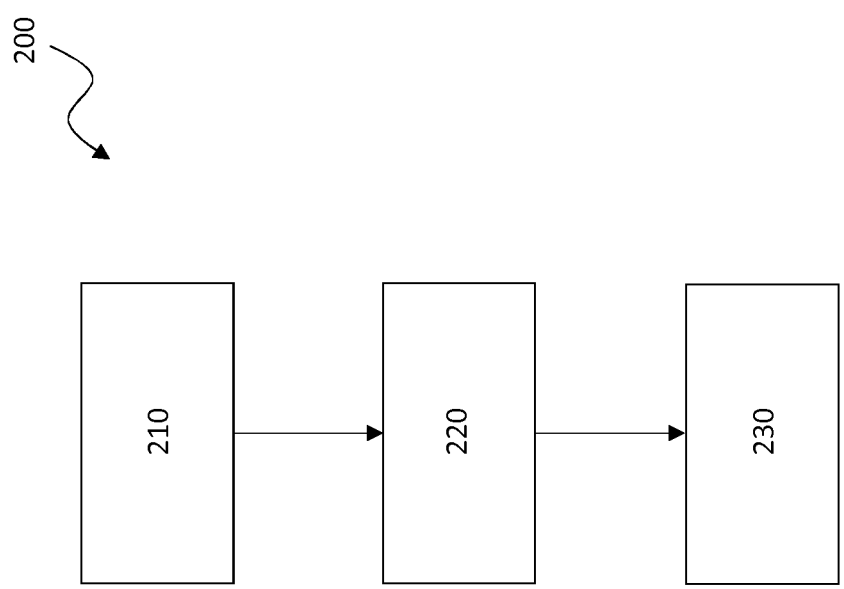
FIG. 2 is a flow chart illustrating in terms of functional blocks a training procedure directed to set the weights of the layers of the CNN of FIG. 1 according to an embodiment of the present invention.

FIG. 2 is a flow chart illustrating in terms of functional blocks a training procedure 200 directed to set the weights $W_l$ of the layers of the CNN 100 according to an embodiment of the present invention.

On this regard, it has to be appreciated that while in the present description reference will be made to CNNs (i.e., convolutional neural networks), the training procedure 200 according to an embodiment of the present invention can be directly applied to any kind of non-convolutional neural networks.

The training procedure 200 comprises a sequence of three main sub-procedures 210, 220, 230.

The first sub-procedure 210 is directed to initially train the CNN 100 according to a standard backpropagation training procedure which exploits a cost function J(W;x,t(x))— wherein t(x) is the target classification array t(x) corresponding to the input image x—without any regularization function.

The second sub-procedure 220 is directed to further train the CNN 100 which was subjected to the training procedure of the first sub-procedure 210 with a backpropagation training procedure which exploits a cost function J(W;x,t(x)) having a regularization function R(W;x) according to an embodiment of the present invention. As will be described in greater detail in the following of the present description, according to an embodiment of the present invention the regularization function R(W;x) depends both on the weights W and on the input image x, unlike already known regularization functions R(W), which depend only on the set of weights W.

The third sub-procedure 230 is directed to further train the CNN 100 which was subjected to the training procedure of the second sub-procedure 220 with a backpropagation training procedure exploiting the same cost function J(W;x,t(x)) used in the second sub-procedure 220. However, unlike the first two sub-procedures 210, 220, according to an embodiment of the present invention, during the third sub-procedure 230 a pruning operation is also performed, directed to set to zero those weights w that have a value lower than a corresponding threshold.

Purpose of the first sub-procedure 210 (which exploits a cost function without regularization function) is to speed up the process and reach the results in a more fast way. However, according to a further embodiment of the present invention, the first sub-procedure 210 may be skipped. Thus, according to this further embodiment of the present invention, the training procedure 200 may directly start with the second sub-procedure 220 (which exploits a cost function comprising the regularization function according to an embodiment of the present invention).

Skipping the first sub-procedure 210 may be useful in case the training procedure 200 is applied to an already trained CNN. This is a quite common case in the Deep Learning field, wherein the starting point is often an already trained CNN which is then further trained for adapt it to different classes. Another case in which the first sub-procedure 210 could be advantageously skipped is when the CNN to be trained has been just initialized with random weights. In this case, however, it may be useful to set the decay rate parameter λ (see equation (3)) to a lower value compared to usual.

Figure 3:
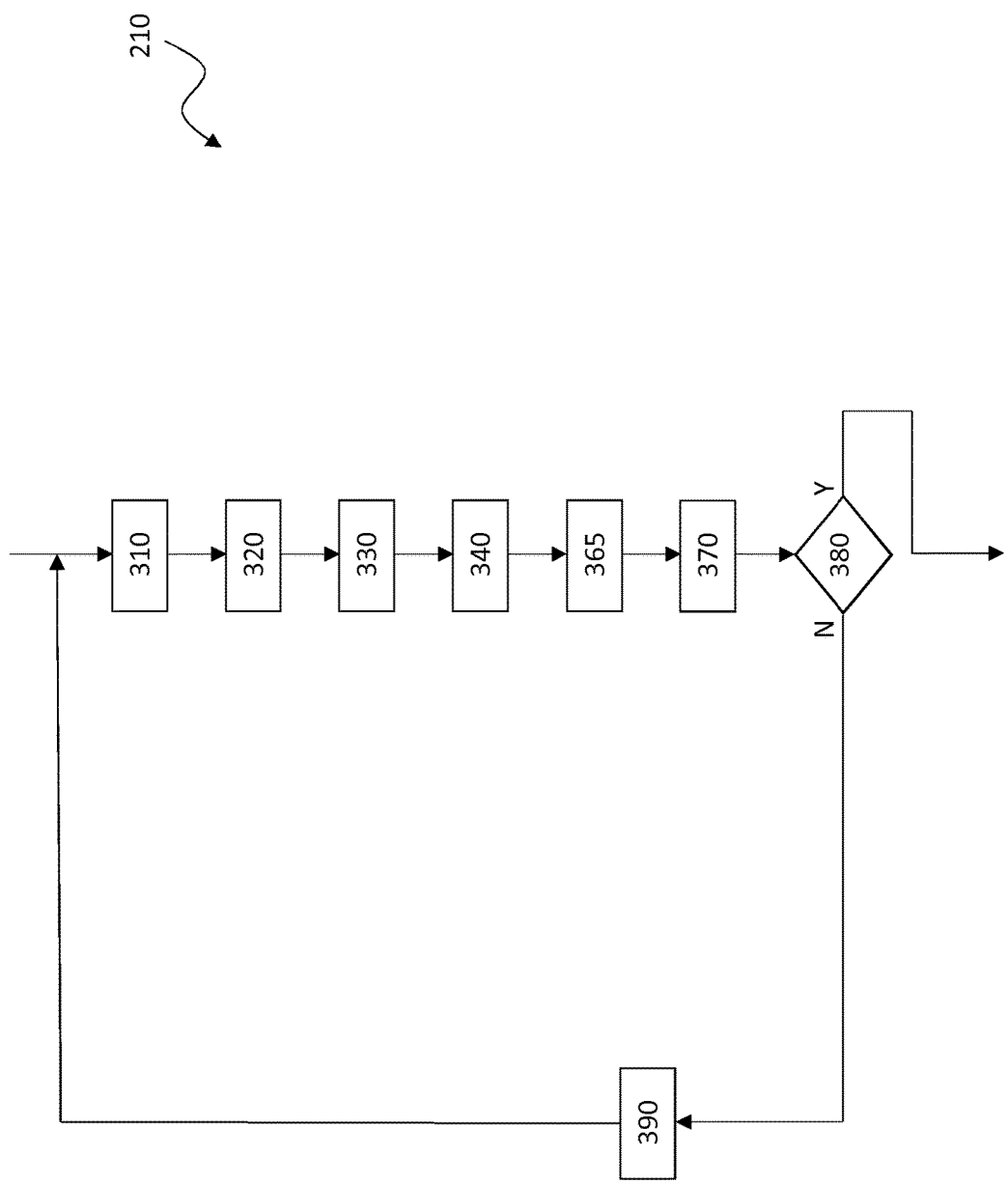
FIGS. 3-5 are flow charts illustrating in terms of functional blocks the main phases of sub-procedures of the training procedure of FIG. 2 according to an embodiment of the present invention.
Figure 4:
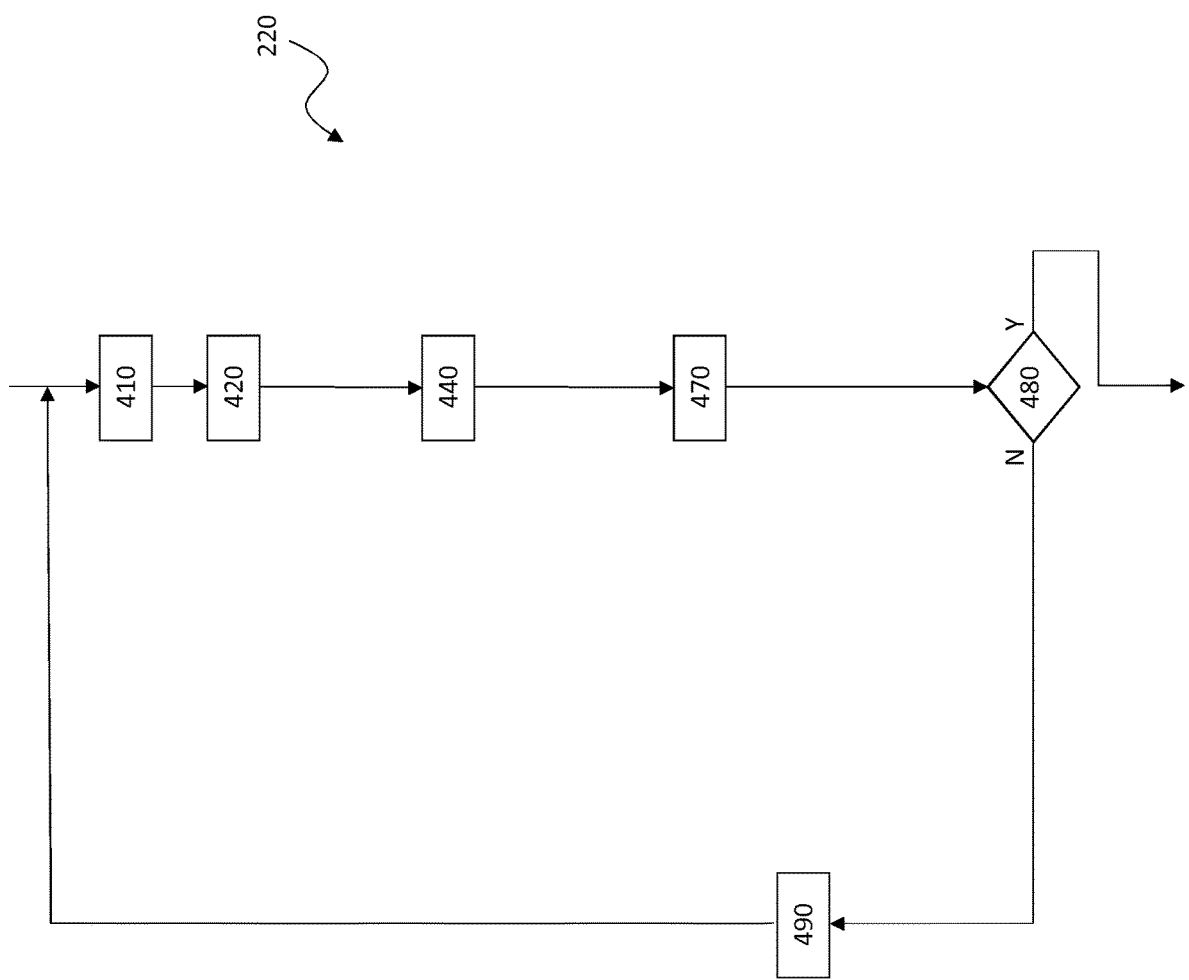
Figure 5:
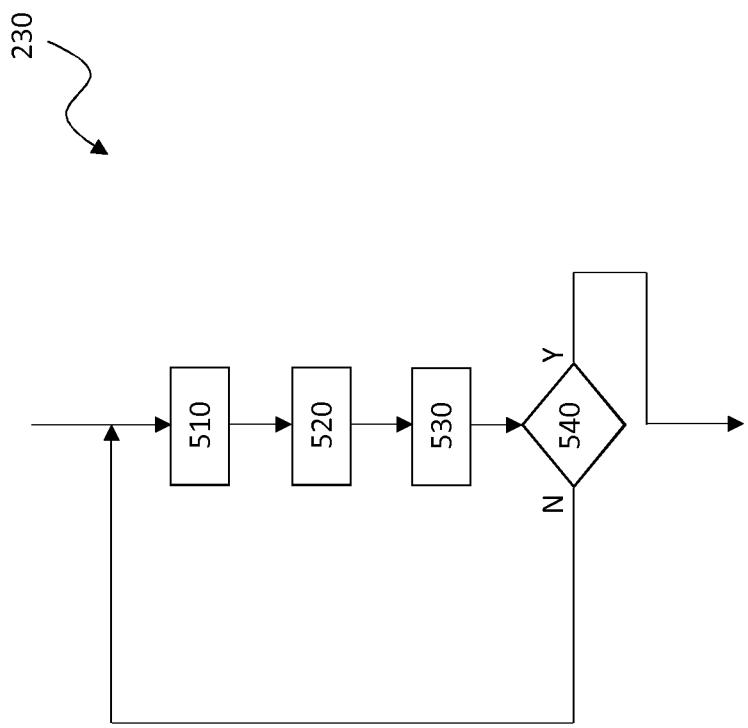

The sub-procedures 210, 220, 230 will be now described in greater detail making reference to FIGS. 3-5. The three sub-procedures 210, 220, 230 provide for updating weights W each time forward and backward phases have been carried out on a set TI(p) (p=1, 2, 3 ... ) of input images x (in this case also referred to as "input training images") belonging to a training database. Each set TI(p) contains |TI(p)| images.

It has to be appreciated that in the following of the description it is assumed that the weights W are updated every time forward and backward phases have been carried out on a single input training image of the training database, generating a gradient of the cost function (i.e., the set TI(p) contains only a single image). However, similar considerations apply in case the weights W are updated after processing a generic set TI(p) of training images, in which case a gradient is computed for each of the training images in TI(p) and the weights in W are updated by means of the average gradient across TI(p). It follows that the considerations apply also in case a single set TI(p) of input training images is present comprising all the training images of the training database, so that the weights W are updated every time forward and backward phases have been carried out on all the training images of the training database.

FIG. 3 is a flow chart illustrating in terms of functional blocks the main phases of the sub-procedure 210.

The first phase of the sub-procedure 210 provides for selecting from a set TI(p) of input training images belonging to the training database an input training image x, and providing such input training image x as input data structure to the CNN 100 to be trained (block 310). The training database comprises known training images, i.e., images for which it is known what class IC (c=c*) the object depicted therein belongs to among the available classes IC(c).

In the next phase (block 320), the CNN 100 process the received input training image x in order to generate a corresponding output classification array y(x;W).

As already mentioned above, having C different classes IC(c), the output classification array y(x;W) is an array comprising C elements $y_c(x;W)$ each one corresponding to a an image class IC(c) and having a value that either represents the probability that the input image x depicts an object belonging to that image class IC(c), or may be transformed into such a probability by applying a mapping such as the softmax function.

In the following phase (block 330), a cost function J(W;x,t(x))=ηL(y(x;W),t(x)) is calculated (see equation 3). In order to calculate the cost function J(W;x, t(x)), any known loss function L(y(x;W),t(x)) can be used, such as the MSE loss function, for which $$L(y(x;W), t(x)) = \frac{1}{C}\sum_{c=1}^{C}(y_c(x;W) - t_c(x))^2 \qquad (4)$$

or the cross-entropy loss function, for which $$L(y(x;W),t(x))=-\Sigma_{c=1}^{C}t_c(x)\log(y_c(x;W)) \quad (5)$$

wherein t(x) is the classification array corresponding to an input training image x belonging to class IC(c*) and comprises C elements $t_c(x)$, c=1 to C, wherein $t_c(x)$=1 for c=c* and $t_c(x)$=0 for c≠c*.

Phases corresponding to blocks 310, 320, 330 correspond to the forward portion of the sub-procedure 210.

The backward portion of the sub-procedure 210 (block 340) provides for calculating the gradient of the cost function J(W;x, t(x)) with respect to the weights W for all the layers recursively from the last layer to the first layer according to the following equation:

$$\nabla_W J(W;x,t(x)) = \left[\frac{\partial J(W;x,t(x))}{\partial w_1}, \frac{\partial J(W;x,t(x))}{\partial w_2}, \ldots\right] \quad (6)$$

Then, the set of weights W of the CNN 100 are updated (block 370). The updating of the weights W is carried out using a gradient descent operation in order to minimize the cost function J(W;x,t(x)) according to the following equation:

$$w^{p+1} = w^p - \frac{\partial J(W;x,t(x))}{\partial w}, \quad (7)$$

wherein $w^p$ is the generic weight of the array $W^p$ of weights w of the CNN 100 in which the training images x of the p-th set TI(p) are used, and $w^{p+1}$ is the generic updated weight w of the CNN 100.

At this point, a check is made (block 380) in order to check whether the considered image x is the last one in the training set or not.

In case the considered image is not the last one (exit block N of block 380), a next training image x is selected (block 390), and all the previously described operations are carried out using this new training image (returning to block 310) producing a version of the CNN 100 having the updated weights $W^{p+2}$.

In case the considered image is the last one (exit block Y of block 380), it means that all the training images of the training database have been used. In this case, it is said that an epoch of the training phase has passed.

The sub-procedure 210 described herein may repeated for several epochs, such as tens of epochs, in order to provide to the CNN 100 the entire training database several times.

FIG. 4 is a flow chart illustrating in terms of functional blocks the main phases of the sub-procedure 220 according to an embodiment of the present invention.

According to an embodiment of the present invention, the sub-procedure 220 is substantially equal to the sub-procedure 210 previously described in FIG. 3, with the main difference that the cost function J(W;x,t(x)) used is different, including a regularization function R(W;x) which depends on the input image x and the array of weights W.

The first phase of the sub-procedure 220 provides for selecting an input training image x, and providing such input training image as input data structure to the CNN 100 to be trained (block 410).

In the next phase (block 420), the CNN 100 processes the received input training image x in order to generate a corresponding output classification array y.

According to an embodiment of the present invention, the training is based on the following cost function $$J(W;x,t(x))=\eta L(y(x;W),t(x))+\lambda R(W;x) \quad (8)$$

(see equation 3). This cost function comprises a regularization function R(W;x) according to an embodiment of the present invention.

The regularization function R(W;x) is a function of the input image x and the array of weights W. According to an embodiment of the present invention, the regularization function promotes low values of the weights in the CNN 100 whenever this may be obtained without reducing the performance of the CNN 100. The regularization function R(W;x) according to an embodiment of the present invention influences the cost function J(W;x,t(x)) by providing a selective penalty to any weight of the CNN 100.

The regularization function is a sum of costs (or penalties) assigned to each weight in proportion to a product which comprises two factors. The first factor is the squared value of the weight; the second factor is a function of how sensitive the output is to a change in the weight, i.e., the second factor provides a quantification of how much the output varies with respect to a change in the weight. The resulting penalty will be large if both factors are large: this will occur when the weight has a large value and the sensitivity to change is low. Conversely, the penalty will be small or even zero when the weight has a small value or the sensitivity to change is high. The regularization function is continuous in the weight w and takes on nonnegative penalty values. In an embodiment, the regularization function is a sum of the penalties from all weights in W:

$$R(W;x)=\frac{1}{2}\Sigma_{w \in W}w^2 H(S(w;x,W)) \quad (9)$$

Here, the two factors discussed above are the squared weight $w^2$ and the function H of sensitivity S. The functions H and S will be defined below.

In order to introduce such a regularization function, it is necessary to define a function S(w;x,W), hereinafter referred to as "sensitivity function". This function quantifies the rate of change in the output of the CNN 100—e.g., the output classification array y(x;W)—as caused by variations of the weight w. The sensitivity function can be defined as the average of the absolute derivatives of the elements $y_c(x;W)$ of the classification array y(x;W) with respect to the weight w, provided that the weight array is W and the input image is x $$S(w;x,W) = \frac{1}{C}\sum_{c=1}^{C}\left|\frac{\partial y_c(x;W)}{\partial w}\right| \quad (10)$$

Given a specific weight configuration W*, of which the weight in consideration is w*, the higher the value of the sensitivity S(w*;x,W*), the higher the variation of the output classification array y(x;W*) in the presence of variations of the weight w in the neighborhood of w*. Hence, if the value of S(w*;x,W*) is large, then a change in the weight w* may lead to substantial changes in the output classification array y(x;W). Conversely, if the value of S(w*;x,W*) is small, then a change in the weight w* has a small impact on the output classification array.

It has to be observed that S(w;x,W) is a local measure, in the sense that a weight may have different sensitivity values at two different weight values w=a and w=b.

According to an embodiment of the present invention, the regularization function R(W;x) is a function whose derivative with respect to the weight w is equal to:

$$\frac{\partial R(W;x)}{\partial w} = wH(S(w,x,W)) \quad (11)$$

where $$H(S(w,x,W)) = \begin{cases} 1 - S(w,x,W) & 0 < S(w,x,W) \leq 1 \\ 0 & S(w,x,W) > 1 \end{cases} \quad (12)$$

In view of the above, the next phase of the procedure according to an embodiment of the present invention (block 440) provides for calculating the derivative of the cost function J(W;x,t(x)) with respect to the weight w according to the following equation:

$$\frac{\partial J(W;x,t(x))}{\partial w} = \eta \frac{\partial L(y(x;W),t(x))}{\partial w} + \lambda \frac{\partial R(W;x)}{\partial w} \quad (13)$$

$$= \eta \frac{\partial L(y(x,W),t(x))}{\partial w} + \lambda w H(S(w,x,W))$$

The updating of each weight w in the set of weights W is carried out using a gradient descent operation in order to minimize the cost function J(W;x,t(x)) according to the following equation $$w^{p+1} = w^p - \eta \frac{\partial L(y(x,W^p),t(x))}{\partial w} - \lambda w^p H(S(w^p;x,W^p)) \quad (14)$$

wherein $W^p$ is the array of weights w of the CNN 100 in which the training images x of the p-th set TI(p) are used, $w^p$ is the generic weight of the array of weights $W^p$, and $w^{p+1}$ is the generic updated weight w of the CNN 100. At this point, the weights are updated into $W^{p+1}$ (block 470).

According to equation (14), the updated weight $W^{p+1}$ is obtained from the previous weight $w^p$. Said operation amounts to subtracting a first term proportional to the loss function derivative (i.e., proportional to the classification error produced by the CNN 100), and subtracting a second term which may range from 0 (H(S(w;W))=0) to $\lambda w^p$ (H(S(w;x,W))=1). The rationale is as follows. If the network output is insensitive to a change in a given weight $w^p$, then the value of S is small and consequently the value of H is near 1; the regularization therefore contributes to changing $w^p$ towards zero by an amount of approximately $\lambda w^p$. Conversely, if the network output is very sensitive to a change in a given weight, then the value of S is high and consequently the value of H is small or zero; the term $\lambda w^p H(S(w^p;x,W^p))$ is therefore also small or zero, and the regularization does not contribute to a change in the weight. The result of this process is pushing toward zero all the weights that are not useful for classifying objects.

From this discussion it should be clear that the regularization factor 2 should have a value in the interval between 0 and 1. Since the sensitivity is a local measure, it is advantageous that the regularization factor 2 be closer to zero than to one; in this case, any weight with a high sensitivity is changed towards zero by a small fraction, such that a new sensitivity value may be computed over the new value of the weight. If the sensitivity value becomes large after some iterations of gradient descent, then the update due to the regularization will stop. If the sensitivity value of a given weight never becomes large over the course of the iterations of gradient descent, then the value of this weight is likely to approach zero.

At this point, a check is made (block 480) in order to check whether the considered training image x is the last one or not.

In case the considered training image x is not the last one (exit block N of block 480), a next training image x is selected (block 490), and all the previously described operations are carried out using this training image returning to block 410) and inputting it to a version of the CNN 100 having the updated weights $W^{p+1}$.

In case the considered training image x is the last one (exit block Y of block 480), it means that all the training images of the training database have been used. In this case, it is said that an epoch of the training phase has passed.

Like in the case of the sub-procedure 210, the sub-procedure 220 as well described herein may repeated for several epochs, such as tens of epochs, in order to provide to the CNN 100 the entire training database several times.

Applicant has found that by minimizing the abovementioned cost function J(W;x,t(x))=ηL(y(x;W),t(x))+λR(W;x), a significant number of weights w assume values close to zero. The absolute values of other weights remain much larger, namely those whose sensitivity has remained large towards the end of the training process. It should be clear that in a weighted sum of pixels (or features), in which some weights are very small and other weights are relatively large, the terms that have very small weights as factors contribute little to the sum. Furthermore, if those very small weights are substituted by zero, the resulting weighted sum is a good approximation to the original sum obtained with all weights unaltered.

This observation suggests a separation of the weights into two disjoint subsets, one containing the small weights and one containing the relatively large weights. Such a separation may be achieved by comparing the absolute values of the weights to a threshold.

This has led the Applicant to develop a method of pruning, i.e., a method that sets exactly to zero all those weights whose absolute values are below a given threshold.

FIG. 5 is a flow chart illustrating in terms of functional blocks the main phases of the sub-procedure 230 which provides for the abovementioned pruning according to an embodiment of the present invention.

The first phase of the sub-procedure 230 provides for setting (block 510) a pruning threshold TH to be used for setting to zero those weights w that have assumed a sufficiently low value.

Empirically it has been observed that, in the absence of a pruning procedure, the weights W of the CNN 100 are distributed according to a Gaussian distribution of mean zero and standard deviation a. In such a distribution, the probability that a weight assumes an absolute value smaller than a given threshold TH is a function of σ and TH. In the alternative case that some weights have been set to zero and an update step is successively applied like the one in Equation (11) and block 470, it may be observed that some weights remain exactly zero while the other weights are clustered around a positive and a negative value. In this alternative case, the distribution of all the weights does not have a simple parametric form. The Applicant has therefore developed a nonparametric procedure in order to carry out the further pruning of weights.

By observing histograms of the absolute values |w| of those weights that are different from zero, the Applicant has found that the distribution of absolute values of these weights is approximately unimodal, i.e. it has one peak, and that this peak occurs near the average absolute value of nonzero weights. Consequently, the threshold that determines which weights will be set to zero can advantageously be proportional to this average absolute value. Alternatively, the threshold may be set so as to separate the nonzero weights into two sets whose numbers of elements have a constant proportion.

According to an exemplary embodiment of the present invention, the pruning threshold is set to:

$$TH = \theta \operatorname*{mean}_{w \in W, w \neq 0} |w| \qquad (15)$$

wherein the mean value is calculated by considering all those weights of the CNN 100 that have values different from zero, and θ is a positive constant smaller than 1, for example $$\theta = \frac{1}{10}.$$

According to a second exemplary embodiment of the present invention, the pruning threshold is set to $$TH, \text{ such that } P(|w| \leq TH) = \theta \qquad (16)$$

wherein P(|w|≤TH) indicates the ratio of two set sizes: one is the number of nonzero weights whose absolute values are smaller than or equal to TH, and one is the number of all nonzero weights.

The next phase (block 520) provides for setting to zero the weights w of the CNN 100 whose absolute value is lower than the pruning threshold TH.

Since the sensitivity function S(w;x,W) used for calculating the gradient of the regularization term R(W;x) is a local measure, its validity is ensured for very small variations of W. Since the pruning process forces some weights to be zero, the pruning threshold TH has been advantageously chosen in order to minimize this type of perturbation due to the pruning itself.

At this point, the CNN 100 is trained for one epoch (block 530) using a training procedure equal to the one corresponding to sub-procedure 220.

A certain decrease in performance (e.g. with respect to classification accuracy) has to be expected as a side effect of the pruning operation. A complete method therefore includes a stopping criterion; for example, the process may be interrupted when the performance reaches a predefined lower bound. Such a mechanism is described below.

The classification accuracy may be defined with respect to a set of images, called a validation set. The validation set does normally not contain any of the images used for training. In the same manner as for the training set, also each image in the validation set must be equipped with a target class, such that validation image x has target classification array t(x). The classification accuracy for the validation set VS can now be defined as a fraction of 100%, where the numerator is the number of images classified correctly by the CNN, and the denominator is the number of images contained in the validation set. The classification accuracy is clearly a function of the weights W in the CNN.

The stopping criterion may now be defined. Suppose that a reference performance has been fixed, for example by measuring the classification performance $A(W^F)$ for a previously trained CNN that has not been pruned (this performance can reasonably be taken as an upper bound to the performance of a pruned sparse CNN). Before training starts, an acceptable performance loss may be set, for example a=0.01, corresponding to a performance loss of 1%.

After the CNN 100 has been trained for one epoch, resulting in weights W, its performance may be compared to the reference performance (block 540). If $$A(W) < (1-a) \cdot A(W^F) \qquad (17)$$

then the training is interrupted, and the weights resulting from the previous training epoch are retained (exit branch Y of clock 540). Otherwise, the weights and the classification performance value are stored, and a new epoch of training may be started (exit branch N of block 540, returning back to block 510).

In an alternative embodiment of the present invention, the sensitivity function has a different definition. Here, the average absolute derivative is replaced by the absolute derivative only for that element of the output classification array that corresponds to the class of the target image. This alternative sensitivity function may thus be written as $$S(w; x, W) = \sum_{c=1}^{C} t_c(x) \left| \frac{\partial y_c(x; W)}{\partial w} \right| \qquad (18)$$

since the target classification array t(x) has value 1 in the element that corresponds to the correct class, while all other elements are 0.

Compared to known solutions, the above described training procedure 200 according to embodiments of the present invention allows to obtain a CNN 100 having a reduced number of parameters (weights w) different from zero, and therefore requiring a reduced memory occupation.

The reduced memory occupation of CNN 100 trained with the training procedure according to the embodiments of the present invention is particularly advantageous in different application scenarios.

For example, a CNN having a reduced memory occupation can be advantageously deployed on devices having a limited storage memory capability due to constraints related to power consumption, price and physical dimension, such as in scenarios in which CNN are deployed on mobile devices provided with an application for visual object classification.

Furthermore, a CNN having a reduced memory occupation can be advantageously deployed on devices by means of a communication network, such as a mobile communication network having reduced bandwidth capabilities. For example, in some scenarios a periodic remote deployment of complex CNNs on the device is required, such as for example for network updating purpose (e.g., for the updating of the weights W of a CNN deployed on a processing device of a control system of a self-driving vehicle which requires a periodic updating to improve the automatic driving performances).

Figure 6:
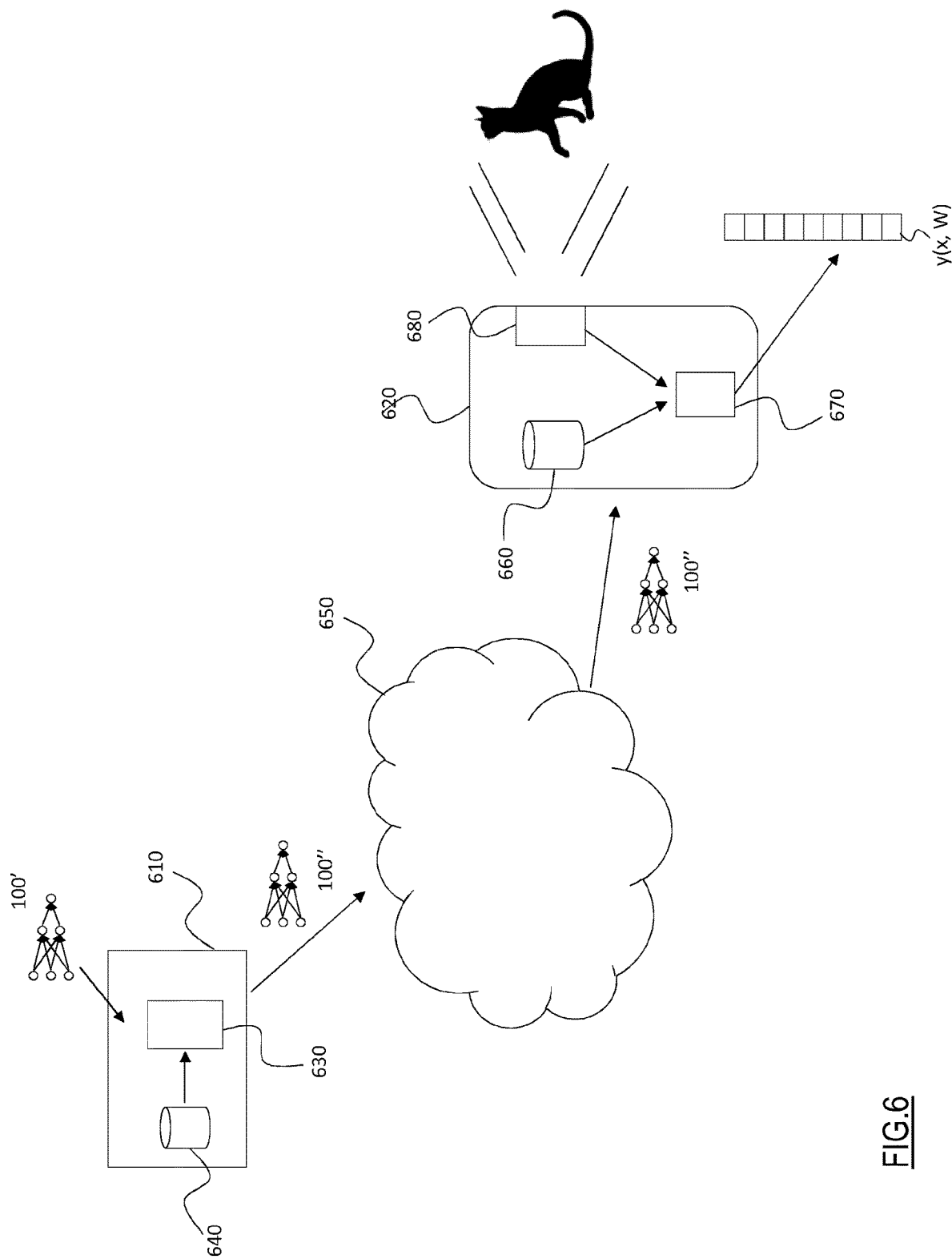
FIG. 6 illustrates in terms of very simplified functional blocks an exemplary application scenario of the solution according to embodiments of the present invention.

FIG. 6 illustrates in terms of very simplified functional blocks an exemplary application scenario of the solution according to embodiments of the present invention. The considered application scenario provides for the training of a CNN on a server module 610 and then for the deployment of the trained CNN on a mobile device 620 running an application for object classification purposes.

The (untrained) CNN, identified in figure with reference 100', is provided to the server module 610 for being trained. As schematized in FIG. 6, the server module 610 comprises a training engine 630, such as a process running on a processor, a processor, an object, an executable, a thread of execution, a program, and/or a computing device software application implementing the training procedure 200 according to the embodiment of the invention. The training engine 630 is further coupled with a training database 640 comprising a training dataset of training images belonging to respective known classes to be used by the training engine 630 for training the CNN 100' using the training procedure 200 according to the embodiment of the invention and obtaining a corresponding trained CNN 100".

The set of weights W of the trained CNN 100" is then transmitted to the mobile device 620 by means of a communication network 650, such as a mobile communication network.

The deployment of the trained CNN 100" is carried out by storing the set of weights W into a memory unit 660 of the mobile device 620.

At this point, the deployed trained CNN 100" can be used by a classification engine 670 of the mobile device 620, such as a process running on a processor, a processor, an object, an executable, a thread of execution, a program, and/or a computing device software application at the mobile device 620 for implementing classification of images x, such as images captured by a camera module 680 of the mobile device 620, and generating a corresponding classification array y(x;W).

The proposed training procedure 200 according to the embodiments of the invention described above has been compared with the method proposed by Han et Al. over a number of well-known neural network architectures and over a number of different image datasets. For each trained model the resulting sparsity and corresponding memory footprint has been measured under the assumption that every parameter (weight w) is stored as a 4-bytes single precision float number according to the IEEE-754 standard. From the following comparisons it will be shown that the training procedure 200 according to the embodiments of the invention improves the network sparsity and thus reduces the deployed model footprint without impairing its performance.

First Experimental Result. LeNet300 (MNIST)

The training procedure 200 according to the described embodiment of the present invention has been compared over the MNIST dataset using the Lenet-300 architecture. The MNIST dataset consists of 28×28 8-bit grayscale images of handwritten digits (C=10 classes). The database consists in 50000 training samples and 10000 test samples.

The LeNet-300 architecture is a simple fully connected network designed for handwritten character recognition and consists in three fully connected layers with 300, 100 and 10 neurons. The CNN has been trained both using the training procedure 200 according to the embodiment of the present invention in which the sensitivity function is the one disclosed in equation 10 and using the training procedure 200 according to the embodiment of the invention in which the sensitivity function is the one disclosed in equation 18. The following table shows, for each layer of the LeNet-300 network architecture, the original number of parameters and the number of remaining parameters for each considered method (lower figures indicate sparser network topologies and so lower memory requirements). Out of about 266 k parameters in the original architecture, the method proposed by Han et al. is able to reduce such figure to about 21 k parameters. The results show that the embodiment of the invention corresponding to equation 10 achieves better sparsity, however the embodiment of the invention corresponding to equation 18 achieves lower overall error (about 0.1% in our experiments) and requires less training time (1 k versus 2.5 k training iterations respectively).

| | | | Proposed training procedure | |
| | | | $\left[\frac{\text{\# remaining parameters}}{\text{\#parameters } LeNet300}100\right]\%$ | |
| | | | Embodiment according to equation 10 | Embodiment according to equation 18 |
| Layer | LeNet300 [# parameters] | Han et al. $\left[\frac{\text{\# remaining parameters}}{\text{\# parameters } LeNet300}100\right]\%$ | $\eta = 0.1$ $\lambda = 10^{-5}$ $\theta = 0.1$ | $\eta = 0.1$ $\lambda = 10^{-4}$ $\theta = 0.1$ |
| fc1-300 | 235K | 8% | 2.25% | 4.78% |
| fc2-100 | 30K | 9% | 11.93% | 24.75% |
| fc3-10 | 1K | 26% | 69.3% | 73.8% |

| | | | Proposed training procedure | |
| | | | Embodiment according to equation 10 $\eta = 0.1$ $\lambda = 10^{-5}$ $\theta = 0.1$ | Embodiment according to equation 18 $\eta = 0.1$ $\lambda = 10^{-4}$ $\theta = 0.1$ |
| | LeNet300 | Han et al. | | |
| Total size [# parameters] | 266K | 21.76K | 9.55K | 19.39K |
| error [%] | 1.8% | 1.6% | 1.65% | 1.56% |

Second Experimental Result. LeNet5 (MNIST)

The previous experiment has been repeated with the MNIST database over the LeNet5 network architecture. The LeNet5 architecture is a simple convolutional network for hidden character recognition consisting in two convolutional layers and two fully connected layers, for a total of about 431 k learnable parameters.

The LeNet5 network is trained both using the training procedure 200 according to the embodiment of the present invention in which the sensitivity function is the one disclosed in equation 10 and using the training procedure 200 according to the embodiment of the invention in which the sensitivity function is the one disclosed in equation 18. The performance of the trained network is then compared in the following table with the performance of Han et al. The table shows trends similar to the results shown for the LeNet-300 architecture. Out of 430 k parameters in the original architecture, the method proposed by Han et al. is able to reduce such figure to about 37 k parameters. The proposed training procedure 200 in its two different embodiments is able to reduce such figure to just 9 k and 11 k parameters for the embodiments corresponding to equations 10 and 18, respectively. The results show that the embodiment of the invention according to equation 10 achieves better sparsity, however the embodiment of the invention according to equation 18 achieves the same error.

chrome images sized 28×28 as the original MNIST dataset. However, images contain items such as bags, clothings, shoes, etc.

The goal of this further experiment is to assess whether the proposed training procedure 200 is able also to sparsify networks operating on denser signals. In fact, the MNIST dataset is a sparse dataset, i.e., a large number of pixels of the input images have value equal to 0. It is well known that sparse signals tend to promote network sparsity during training. Conversely, the Fashion-MNIST database is significantly less sparse, thus achieving a sparse network architecture is more challenging. The MNIST dataset is rather sparse as pixels have values around either 0 (black pixel) and 255 (white pixel). Conversely, the Fashion-MNIST dataset has a lot of more information along intermediate pixel intensity values representing different shades of gray.

The following table shows trends similar to the results shown for the LeNet-5 architecture when trained over the original MNIST dataset. Out of 430 k parameters in the original architecture, the method proposed by Han et al. is able to reduce such figure to about 46 k parameters. The proposed training procedure 200 in its two different embodiments is able to reduce such figure to just 37 k and 61 k parameters for the embodiments corresponding to equations 10 and 18, respectively. The results show that the embodiment corresponding to equation 10 allows to obtain better sparsity, however the embodiment corresponding to equa-

| Layer | LeNet5 [# parameters] | Han et al. $\left[\frac{\text{\# remaining parameters}}{\text{\# parameters } LeNet5}100\right]\%$ | Proposed training procedure $\left[\frac{\text{\# remaining parameters}}{\text{\#parameters } LeNet5}100\right]\%$ | |
|---|---|---|---|---|
| | | | Embodiment according to equation 10 $\eta = 0.1$ $\lambda = 10^{-4}$ $\theta = 0.1$ | Embodiment according to equation 18 $\eta = 0.1$ $\lambda = 10^{-4}$ $\theta = 0.1$ |
| conv1 | 0.5K | 66% | 67.6% | 72.6% |
| conv2 | 25K | 12% | 11.76% | 12.04% |
| fc3 | 400K | 8% | 0.90% | 1.26% |
| fc4 | 5K | 19% | 31.04% | 37.42% |

| | LeNet5 | Han et al. | Proposed training procedure | |
|---|---|---|---|---|
| | | | Embodiment according to equation 10 $\eta = 0.1$ $\lambda = 10^{-4}$ $\theta = 0.1$ | Embodiment according to equation 18 $\eta = 0.1$ $\lambda = 10^{-4}$ $\theta = 0.1$ |
| Total size [# parameters] | 431K | 36.28K | 8.43K | 10.28K |
| error[%] | 0.8% | 0.8% | 0.8% | 0.8% |

Third Experimental Result LeNet5 (Fashion MNIST)

The previous experiment has been repeated over the Fashion-MNIST dataset (https://github.com/zalandoresearch/fashion-mnist). Such dataset consists in monotion 18 achieves the same error. This experiment confirms that images that are less sparse yield networks that have naturally more meaningful parameters. Nevertheless, the proposed training procedure 200 is still able to increase the network sparsity even with non-sparse signals.

| | | | Proposed training procedure $\left[\dfrac{\text{\# remaining parameters}}{\text{\#parameters }LeNet5}100\right]\%$ | |
|---|---|---|---|---|
| | | | Embodiment according to equation 10 | Embodiment according to equation 18 |
| Layer | LeNet5 [# parameters] | Han et al. $\left[\dfrac{\text{\# remaining parameters}}{\text{\# parameters }LeNet5}100\right]\%$ | $\eta = 0.1$ $\lambda = 10^{-5}$ $\theta = 0.1$ | $\eta = 0.1$ $\lambda = 10^{-5}$ $\theta = 0.1$ |
| conv1 | 0.5K | 73% | 76.2% | 84.4% |
| conv2 | 25K | 30.32% | 32.56% | 49.26% |
| fc3 | 400K | 8.63% | 6.50% | 11.2% |
| fc4 | 5K | 56.86% | 44.02% | 65.32% |

| | | | Proposed training procedure | |
|---|---|---|---|---|
| | | | Embodiment according to equation 10 $\eta = 0.1$ $\lambda = 10^{-5}$ $\theta = 0.1$ | Embodiment according to equation 18 $\eta = 0.1$ $\lambda = 10^{-5}$ $\theta = 0.1$ |
| | LeNet5 | Han et al. | | |
| Total size [# parameters] | 431K | 45.24K | 36.72K | 60.72K |
| error[%] | 8.8% | 8.5% | 8.5% | 8.5% |

Fourth Experimental Result VGG-16 (ImageNet)

As a final experiment, the previous experiment has been repeated with the Imagenet database over the VGG-16 network architecture.

The ImageNet dataset consists of 224×224 24-bit color images of 1000 different types of objects (C=1000 classes). The database consists in 1M training samples and 100 k test samples. With respect to the MNIST dataset, the ImageNet dataset represents more closely practical large-scale object recognition problems.

The VGG-16 architecture is a far more complex convolutional network architecture for generic object character recognition consisting in 13 convolutional layers and three fully connected layers as shown below in the table, for a total of about 138M of learnable parameters. Concerning the number of parameters, the VGG-16 has about 250 more times parameters than the LeNet5 architecture, represents more closely the scale of the networks practically deployed to solve large scale object recognition problems.

The VGG-16 network has been trained with the proposed training procedure 200 both according to the embodiment corresponding to equation 10 and according to the embodiment corresponding to equation 18. The performance of the trained network in both the two cases is then compared to the one of Han et al. in the following table. The table shows trends similar to the results shown for the LeNet-300 architecture. Out of 138M parameters in the original architecture, the method proposed by Han et al. is able to reduce such figure to about 10.3M parameters. The proposed training procedure 200 in its two different embodiments is able to reduce such figure to about 11.3 M and 9.8 M parameters. Finally, the experiment shows that the proposed training procedure 200 is able to reduce the network error by about 1% while increasing the network sparsity.

| | | | Proposed training procedure $\left[\dfrac{\text{\# remaining parameters}}{\text{\# parameters }VGG\text{-}16}100\right]\%$ | |
|---|---|---|---|---|
| | | | Embodiment according to equation 10 | Embodiment according to equation 18 |
| Layer | VGG-16 [# parameters] | Han et al. $\left[\dfrac{\text{\# remaining parameters}}{\text{\# parameters }VGG\text{-}16}100\right]\%$ | $\eta = 10^{-3}$ $\lambda = 10^{-6}$ $\theta = 0.1$ | $\eta = 10^{-3}$ $\lambda = 10^{-5}$ $\theta = 0.1$ |
| conv1_1 | 2K | 58% | 97.80% | 96.35% |
| conv1_2 | 37K | 22% | 90.47% | 80.87% |
| conv2_1 | 74K | 34% | 87.81% | 81.49% |
| conv2_2 | 148K | 36% | 84.96% | 81.41% |
| conv3_1 | 295K | 53% | 83.44% | 77.68% |
| conv3_2 | 590K | 24% | 81.92% | 71.81% |
| conv3_3 | 590K | 42% | 80.85% | 69.25% |
| conv4_1 | 1M | 32% | 71.07% | 62.03% |

-continued

| | | | | |
|---|---|---|---|---|
| conv4_2 | 2M | 27% | 62.96% | 51.2% |
| conv4_3 | 2M | 34% | 62.34% | 51.91% |
| conv5_1 | 2M | 35% | 60.47% | 57.09% |
| conv5_2 | 2M | 29% | 59.66% | 57.08% |
| conv5_3 | 2M | 36% | 59.63% | 47.75% |
| fc6 | 103M | 4% | 1.08% | 1.13% |
| fc7 | 17M | 4% | 6.27% | 8.35% |
| fc8 | 4M | 23% | 35.43% | 14.81% |

| | | | Proposed training procedure | |
|---|---|---|---|---|
| | VGG-16 | Han et al. | Embodiment according to equation 10 $\eta = 10^{-3}$ $\lambda = 10^{-6}$ $\theta = 0.1$ | Embodiment according to equation 18 $\eta = 10^{-3}$ $\lambda = 10^{-5}$ $\theta = 0.1$ |
| Total size [# parameters] | 138M | 10.35M | 11.34M | 9.77M |
| Error [Top1 %-Top5 %] | 31.50%-11.32% | 31.34%-10.88% | 29.29%-9.8% | 30.92%-10.06% |

The previous description presents and discusses in detail several embodiments of the present invention; nevertheless, several changes to the described embodiments, as well as different invention embodiments are possible, without departing from the scope defined by the appended claims.

The invention claimed is:

1. A method, comprising:
providing a neural network having a set of weights and being configured to receive an input data structure for generating a corresponding output array according to values of said set of weights;
training the neural network to obtain a trained neural network, said training comprising setting values of the set of weights by means of a gradient descent algorithm which exploits a cost function comprising a loss term and a regularization term;
deploying the trained neural network on a device through a communication network; and
using the deployed trained neural network on the device,
wherein the regularization term is based on a rate of change of elements of the output array caused by variations of the set of weights values,
wherein said training further comprises setting to zero weights of the set of weights having a value lower than a corresponding threshold after setting values of the set of weights by means of the gradient descent algorithm,
wherein said regularization term is based on a sum of penalties each one penalizing a corresponding weight of the set of weights, each penalty being based on the product of a first factor and a second factor calculated prior to calculating the sum of the penalties, wherein:
said first factor is based on a power of said corresponding weight, particularly a square of the corresponding weight, and
said second factor is based on a sensitivity function of how sensitive the output array is to a change in the corresponding weight.

2. The method of claim 1, wherein said sensitivity function corresponds to the average of absolute values of derivatives of output elements of the output array with respect to the weight.

3. The method of claim 1, wherein:
said training comprises, for each one among a plurality of training input data structures, comparing the output array generated by the neural network according to said training input data structure with a corresponding target output array having only one nonzero element, and
said sensitivity function corresponds to the absolute value of the derivative, with respect to the weight, of an element of the output array corresponding to said one nonzero element of the target output array.

4. The method of claim 1, wherein said training comprises calculating a corresponding updated weight from each weight of the set of weights by subtracting from said weight:
a first term based on the derivative of the loss term with respect to the weights, and
a second term based on the product of said weight and a further function, said further function being equal to one minus said sensitivity function if said sensitivity function is not higher than one, and being equal to zero if said sensitivity function is higher than one.

5. The method of claim 1, further comprising setting said threshold to a selected one between:
a threshold value based on the mean of the non-zero weights;
a threshold value such that a ratio of a first set size to a second set size is equal to a constant, wherein said first set size is the number of nonzero weights whose absolute values are smaller than or equal to said threshold value and said second set size is equal to the number of all nonzero weights.

6. The method of claim 1, wherein said deploying the trained neural network on a device comprises sending nonzero weights of the trained neural network to the device through said communication network.

7. The method of claim 1, wherein said using the deployed trained neural network on the device comprises using the deployed trained neural network with an application for a visual object classification running on the device.

8. The method of claim 1, wherein said device is a mobile device.

9. The method of claim 1, wherein said device is a processing device of a control system of a self-driving vehicle.

10. The method of claim 1, further comprising setting said threshold to a threshold value such that a ratio of a first set size to a second set size is equal to a constant, wherein said first set size is the number of nonzero weights whose absolute values are smaller than or equal to said threshold value and said second set size is equal to the number of all nonzero weights.

* * * * *